United States Patent
Yamaguchi et al.

(10) Patent No.: US 7,092,174 B2
(45) Date of Patent: Aug. 15, 2006

(54) IMAGE PICKUP LENS, IMAGE PICKUP APPARATUS AND METHOD FOR FORMING IMAGE PICKUP LENS

(75) Inventors: Susumu Yamaguchi, Hachioji (JP); Hiroyuki Hattori, Hachioji (JP)

(73) Assignee: Konica Corporation, Tokyo (JP)

( * ) Notice: Subject to any disclaimer, the term of this patent is extended or adjusted under 35 U.S.C. 154(b) by 928 days.

(21) Appl. No.: 10/145,080

(22) Filed: May 13, 2002

(65) Prior Publication Data

US 2003/0016454 A1 Jan. 23, 2003

(30) Foreign Application Priority Data

May 18, 2001 (JP) ............................. 2001-148911
May 18, 2001 (JP) ............................. 2001-148913
May 23, 2001 (JP) ............................. 2001-153635

(51) Int. Cl.
*G02B 7/02* (2006.01)
(52) U.S. Cl. ...................... 359/819; 359/811; 359/813; 359/814; 359/823; 369/44.14; 369/661
(58) Field of Classification Search ................ 359/819, 359/811, 719, 813, 814, 823, 824; 369/44.14, 369/656–661
See application file for complete search history.

(56) References Cited

U.S. PATENT DOCUMENTS

| | | | |
|---|---|---|---|
| 5,516,456 A | 5/1996 | Shinohara et al. | 252/299.01 |
| 5,783,815 A | 7/1998 | Ikeda | 250/208.1 |
| 5,796,700 A * | 8/1998 | Lee et al. | 369/112.24 |
| 5,896,093 A | 4/1999 | Sjoborn | 340/815.75 |
| 6,324,149 B1 * | 11/2001 | Mifune et al. | 369/112.01 |
| 6,552,585 B1 * | 4/2003 | Poullet | 327/115 |
| 2002/0131782 A1 * | 9/2002 | Yamaguchi et al. | 396/429 |

FOREIGN PATENT DOCUMENTS

GB 775587 5/1957
WO WO9322787 11/1993

* cited by examiner

*Primary Examiner*—Ricky Mack
*Assistant Examiner*—Brandi Thomas
(74) *Attorney, Agent, or Firm*—Squire, Sanders & Dempsey, L.L.P.

(57) ABSTRACT

The present invention relates to an image pick-up lens, an image pick-up apparatus comprising the image pick-up lens and a producing method of the image pick-up lens, and the image pick-up lens comprising: a lens part to form an image point of an object point at predetermined distance; and a supporting part to support the lens part and integrally formed with the lens part in a tubular form extended from the periphery of the lens part along the optical axis of the lens part, and the tip end of the tubular form is included in an ideal plain surface perpendicular to the optical axis of the lens part, wherein the image point is located in the ideal plain surface.

36 Claims, 10 Drawing Sheets

EXAMPLE 1

IMAGE PICKUP LENS, IMAGE PICKUP APPARATUS AND METHOD FOR FORMING IMAGE PICKUP LENS

FIELD OF THE INVENTION

The present invention relates to an image pick-up lens, an image pick-up apparatus and a method for forming the image pick-up lens; and particularly to an image pick-up lens and an image pick-up apparatus which can be mounted on a cellular phone or a personal computer, and to a method for forming such a lens and apparatus.

BACKGROUND OF THE INVENTION

In recent years, easy handling of digital image data has been realized by improved performance of the CPU and development of image processing technique. Especially the cellular phones and PDA (Personal Digital Assistance) provided with a display unit capable of image display have become available on the market and the drastic improvement in radio communication speed can be expected in the very near future. Accordingly, frequent transfer of image data is considered to be made among cellular phones and PDA.

At present, a subject is converted into an image data by a digital still camera or the like, and such an image data is then transferred via a personal computer or the like via the Internet. This method however requires both a digital still camera and a personal computer to be purchased in order to transfer image data. On the other hand, attempts have been made to mount such an image device as a CCD (Charge Coupled Device) type image sensor on the cellular phone. Such an attempt will eliminate the need of purchasing a digital still camera and personal computer, and will provide easy means of sending an image to a counterpart device through a cellular phone which can be easily carried.

At present, however, the weight of a cellular phone will be increased if the cellular phone is equipped with the function of a large-sized digital still camera which is much larger than the cellular phone, with the result that the phone cannot be easily carried. In addition to this problem, the manufacturing cost will be increased that much.

Even if an image pick-up optical system and an image pick-up device as major components of the digital still camera, a photo-electric conversion unit of the image pick-up device must be properly set at the focusing position of the image pick-up optical system. This raises the problem of how to make this adjustment. For example, when the image pick-up device and image pick-up optical system are to be installed on one and the same base board, it can be said to be difficult to install the photo-electric conversion unit of the image pick-up device at the focusing position of the image pick-up optical system with high precision due to such factors as variations in the thickness of adherent used for mounting on the base board or variations in the dimensions of component parts. Accordingly, an advanced level of high precision installation technique is essential or a separate mechanism is necessary to adjust the focusing position, in order to improve the precision of mounting the photo-electric conversion unit of the image pick-up device at the focusing position of the image pick-up optical system. This will raise the manufacturing cost. The following cities an example to describe the problems involved in the prior art.

FIG. 6 is a cross sectional view representing an example of the image pick-up apparatus according to the prior art. An image pick-up device 110 is laid out on the base board PC made of glass epoxy, and is connected to the image processing IC circuit 111 provided on the back surface of the base board PC via multiple wires W leading from the stop surface of a terminal (not illustrated).

A first enclosure 101 is provided so as to cover the image pick-up device 110, and a second enclosure 102 is mounted thereon. They are locked together on the base board by means of bolts 103. An infrared ray cutoff filter is arranged between the first enclosure 101 and second enclosure 102.

The top of the second enclosure 102 is cylindrical, and the lens body tube 105 enclosing a lens 106 is mounted in such a way that the position of this body tube can be adjusted in the direction of optical axis with respect to the second enclosure 102 by meshing a male screw 105a with a female screw 102a formed inside the second enclosure 102. A lens aperture 105b is formed on the top of the lens body tube 105.

Such an image pick-up apparatus according to the prior art is a comparatively large-sized apparatus comprising multiple component parts. In addition to the above-mentioned high cost problems, this configuration will require a lot of time in assembling these parts, and the relative position between the image pick-up device 110 and lens 106 must be adjusted by rotating the lens body tube 105 at the time of assembling.

To solve these problems, an attempt has been made to provide the lens with a supporting part extended close to the focus position. This part is brought into direct contact with the image pick-up device, thereby configuring an image pick-up apparatus according to this attempt. This attempt allows an easy layout of the photo-electric conversion unit of the image pick-up device at the focusing position of the lens, with the result that a substantial amount of time and labor can be saved to assemble an image pick-up apparatus.

However, this method raises the problem of what profile the lens supporting part should have. For example, three or four legs are extended from the lens toward the image pick-up device. These legs, however, has a problem of being easily deformed by external force. If legs are deformed, a deviation is caused between the photo-electric conversion unit of the image pick-up device and lens focusing point, and this may deteriorate the image quality.

Another problem is how to manufacture an image pick-up lens where the periphery of a lens is extended in the direction of optical axis. If plastic is used as a material, a mass production of image pick-up lens of stable quality can be achieved by injection molding using a mold. If injection molding is used, however, burrs are likely to be formed on the split portion of the mold. When the gate is cut off, burrs are also likely to occur. Depending on the position of these burrs, the assembling precision may be deteriorated, with the result that function of the image pick-up device may not be fully performed.

A further problem is how to adjust the positional relationship between the surface formed by the tip of supporting part and lens surface in order to ensure precise layout of the photo-electric conversion unit of the image pick-up device.

SUMMARY OF THE INVENTION

The present invention has been made to solve these problems. Its object is to provide a highly reliable image pick-up lens, image pick-up apparatus and their forming method wherein a reduced number of component parts can be assembled accurately in a compact configuration at a reduced cost without the need of adjustment, and dust- and moisture-proof structure is provided to ensure high quality image. This objects can be achieved by the following structures:

(Structure 1-(1))

An image pick-up lens, comprising:

a lens part to form an image point of an object point at predetermined distance; and a supporting part (hereinafter may be referred to as ("leg part") to support the lens part and integrally formed with the lens part in a tubular form extended from the periphery of the lens part along the optical axis of the lens part, and the tip end of the tubular form is included in an ideal plane surface perpendicular to the optical axis of the lens part, wherein the image point is located in the ideal plane surface.

(Structure 1-(2))

An image pick-up apparatus, comprising:

an image pick-up device to convert an optical image into image signals, and having a photo-electric conversion unit; and an image pick-up lens comprising:

a lens part to form an image point of an object point at predetermined distance; and a supporting part to support the lens part and integrally formed with the lens part in a tubular form extended from the periphery of the lens part along the optical axis of the lens part, and the tip end of the tubular form is included in an ideal plane surface perpendicular to the optical axis of the lens part, wherein the image point is located in the ideal plane surface.

(Structure 1-(3))

A method of producing an image pick-up lens according to Structure 1-(1) with a first mold to form a surface on the tip end of the supporting part and second mold to form a tip end side optical surface of the lens part, comprising the step of:

moving relatively the first mold and the second mold along the optical axis of the lens part so that the image point is located in the ideal plane surface.

In the present invention, the periphery of the lens part is defined to mean the area other than the area transmissive to light in the lens at least.

The supporting part formed in the direction of optical axis (or extension in the direction of optical axis) in the above description should be understood to mean not only the supporting part formed accurately in parallel to the optical axis, but also the supporting part which is formed in such a way that the lens is positioned with a predetermined space relative to the photo-electric conversion unit of the image pick-up device.

Further, "to form an image point of object point at predetermined distance" means forming an image point of an object point located somewhere between infinitely far distance and close distance.

The objects of the present invention can be also achieved by the following Structures.

(Structure 2-(1))

An image pick-up lens comprising:

a lens part to form an image point of an object point at predetermined distance;

a flange part formed around the periphery of the lens part; and a supporting part to support the lens part and integrally formed with the lens part in a tubular form extended from the periphery of the lens part along the optical axis of the lens part, wherein an engaging portion is provided around the outer surface of the supporting portion closer to the optical axis of the lens part than the outer surface of the flange part for positioning in the direction perpendicular to the optical axis of the lens part.

(Structure 2-(2))

An image pick-up lens comprising:

a lens part;

a flange part formed around the periphery of the aforementioned lens part;

a supporting part arranged on the aforementioned periphery of the lens part in the direction of the optical axis of the aforementioned lens part; and an engagement section (or an engaging portion) arranged at a predetermined position of the supporting part close to the aforementioned optical axis with respect to the flange part, this engagement section being perpendicular to the optical axis of the lens part.

According to the image pick-up lens mentioned in Structure 2-(1) and 2-(2), flow of resin to the lens is improved by installing a gate on the flange part, for example, at the time of injection molding. While making an effective use of this advantage, the lens part is positioned in the direction at right angles to the optical axis, using the outer surface of the supporting part arranged on the side close to the optical axis with respect to the aforementioned flange part. In the step of positioning, this makes it possible to ignore the impact of burrs or flashes which may occur to the gate, with the result that positioning accuracy is improved. The supporting part can be extended to each side in the direction of optical axis.

Further, the aforementioned supporting part has a positioning surface (contacting portion) for use in positioning in the direction of optical axis. This structure ensures easier positioning in that direction.

The aforementioned flange part is located at the place subjected to elastic force of an elastic member.

This elastic member is preferred to be made of a coil spring because stable elastic force can be maintained for a long period of time.

The aforementioned flange part is preferred to have a rotary stopper since it avoids inadvertent rotation of the image pick-up lens.

Further, this rotary stopper is preferred to be D-cut since it allows the rotary stopper to be formed easily.

Moreover, a shoulder for fitting the aperture member for regulating the F-number of the lens is preferred to be formed on the object side of the lens because it facilitates the installation of an aperture.

(Structure 2-(3))

An image pick-up apparatus comprising:

a base board;

an image pick-up device installed on this base board; and an image pick-up lens molded of plastic material comprising:

a lens part;

a flange part arranged around the periphery of the lens part; and a leg part (also called a "supporting part") extending in the direction of optical axis from the periphery of the lens part;

wherein the lens part is positioned in the direction at right angles to the optical axis, using the outer surface of the leg part arranged on the side close to the optical axis with respect to the aforementioned flange part.

(Structure 2-(4))

An image pick-up apparatus comprising:
a base board;
an image pick-up device provided on the base board; and
an image pick-up lens for form an image onto the image pick-up device;
wherein the image pick-up lens comprises
a lens part;
a flange part formed around the periphery of the lens part;
a supporting part arranged on the periphery of the lens part in the optical axis direction of the lens part; and
an engagement section (or an engaging portion) arranged at a predetermined position of the supporting part close to the optical axis with respect to the flange part, this engagement section being perpendicular to the optical axis.

According to the image pick-up apparatus of Structures 2-(3) and 2-(4), flow of resin to the lens part is improved by installing a gate on the flange part, for example, at the time of injection molding. While making an effective use of this advantage, the lens part is positioned in the direction at right angles to the optical axis, using the outer surface of the supporting part arranged on the side close to the optical axis with respect to the aforementioned flange part. In the step of positioning, this makes it possible to ignore the impact of burrs or flashes which may occur to the gate, with the result that positioning accuracy is improved. The supporting part can be located on either side in the direction of optical axis. However, it is preferred to be extended to the side of the image pick-up device because it facilitates positioning in the direction of optical axis. Further, the CMOS (Complementary Metal Oxide Semiconductor) type image sensor is suitable for use as the aforementioned image pick-up device, but CCD type image sensor can also be used.

Furthermore, the supporting part is preferred to have a contacting portion, which brings it into contact with the image pick-up device, because focusing point can be adjusted merely by mounting the image pick-up lens on the image pick-up device when the supporting part is extended to the focusing point of the lens. This means a substantial reduction of time and labor in the assembling step.

The aforementioned flange part is preferred to be located at the position subjected to elastic force of an elastic member, because the support leg can be energized toward the image pick-up device using this elastic force, with the result that the influence of vibration or impact can be alleviated effectively.

Furthermore, the elastic member is preferred to be made of a coil spring because stable elastic force can be maintained for a long period of time.

It is also preferred that the image pick-up device have a lens frame mounted on the base board and the flange part have a rotary stopper for preventing relative rotation with the lens frame, because this makes it possible to prevent the supporting part from interfering with the pad due to inadvertent rotation of the image pick-up lens, for example, when A pad for mounting the wire or the like is provided on the top surface of the image pick-up device.

Further, this rotary stopper is preferred to be D-cut since it allows the rotary stopper to be formed easily.

Moreover, a shoulder for fitting the aperture member for regulating the F-number of the lens is preferred to be formed on the object side of the lens because it facilitates the installation of an aperture.

The aforementioned image pick-up device can be designed in such a way that a protective member made up of such a parallel plate as glass plate is provided at least partly on the surface of the photo-electric conversion unit. In this case, the leg of the image pick-up device is engaged with the image pick-up device via this protective member.

(Structure 3-(1))

An image pick-up lens comprising:
a lens part; and
a supporting part extending from the periphery of the lens part, this supporting part formed in the direction of optical axis of the lens part;
wherein the lens part and supporting part are integrally molded in one piece by injection of the plastic material, the supporting part is formed in a tubular shape extending in the direction of optical axis of the lens, and the tip of the supporting part is formed in the vicinity of the focusing position of the lens.

According to the image pick-up lens of the aforementioned Structure 3-(1), the lens can be protected against external force by the highly rigid tubular supporting part and can be supported. Further, this allows precision fitting between the focusing position of the lens and the photo-electric conversion unit of the image pick-up device, for example, by contacting the tip of the supporting part with the top surface of the image pick-up device. Since the image pick-up lens is made of plastic material, it is possible to reduce the fluctuation of the focusing position of the lens caused by temperature change. In other words, the refractive index of the plastic lens is reduced with the rise of temperature. In this case, the focusing position of the lens moves away from the lens.

On the other hand, the supporting part is elongated by the rise of temperature, and this has an effect of reducing the deviation of the focusing position from the photo-electric conversion unit of the image pick-up device.

Furthermore, the supporting part is preferably designed in a cylindrical form. This allows the mold structure to be simplified when the image pick-up lens is manufactured by injection molding. Also, this profile ensures that flow of material from the gate around the lens at the time of injection molding is not easily blocked, and effectively prevents unsymmetrical geometric error from occurring on the lens surface.

Also, the supporting part has a engaging portion (or a fitting portion) for positioning in the direction perpendicular to the optical axis. Especially when the engaging portion is cylindrical, the counterpart to be fitted is made in a cylindrical form, thereby ensuring precision fitting.

Furthermore, the supporting part has a contacting portion whose thickness in the direction perpendicular to the optical axis is smaller than that of the cylindrical portion. When this configuration is adopted, the split portion of the mold is shifted to the portion whose thickness is greater than that of the contacting portion at the time of molding the image pick-up lens. Then even if burrs occur along the split portion of the mold at the time of injection molding, it is possible to prevent these burrs from protruding out of the contacting portion. This solves the problem of Image quality being deteriorated by the focusing position, which is displaced by the amount equivalent to the burrs protruding from the contacting portion, where these burrs are located between the contacting portion and the reference surface for focusing position where it is mounted.

Also, the supporting part is shaped in such a way that the optical axis of the lens part is perpendicular to the plane surface when the image pick-up lens is mounted on the plane surface with the tip facing downward. This allows the image pick-up lens to be left standing with the tip in contact with the plane surface, for example, at the time of assembling.

This feature conveniently eliminates the need of using a support base. Furthermore, such a configuration allows a point contact instead of surface contact to be used for support in the direction perpendicular to the optical axis. This provides great benefit for positioning.

The image pick-up lens has a saturated water absorption rate not exceeding 1.2%. The lens made of plastic material (hereinafter referred to as "plastic lens") has the saturated water absorption rate greater than that of the glass lens, so there will be lack of uniformity in the amount of absorbed water on a transient basis if there is a sudden change in humidity. This will result in an uneven refractive index, and poor performance of excellent image formation. However, if this rate is kept 1.2% or less (preferably 0.7% or less), such a problem can be reduced. Also, since the plastic lens has a refractive index increased by moisture absorption, the focusing position of the lens changes in the direction of coming closer to the image pick-up lens in the present invention. In the meantime, the supporting part is also elongated by moisture absorption, so there is a disadvantage of the deviation of the focusing position being increased by moisture absorption. However, if this rate is kept 1.2% or less (preferably 0.7% or less), such a problem can be reduced. It should be noted that the material having a saturated water absorption rate of 0.7% or less includes a polyolefinic plastic material (0.01%), for example.

Furthermore, when the supporting part is made of light-proof plastic material having a light blocking effect, it is possible to prevent unwanted light from passing through the peripheral surface of the supporting part to reach the surface where an image is formed. This protects the image quality against adverse effects.

Further, at least part of the inner peripheral surface of the aforementioned cylindrical supporting part is preferred to be provided with internal antireflection treatment. Because this will prevent the unwanted light from being reflected on the supporting part to reach the image-forming surface. This protects the image quality against adverse effects.

The inner peripheral surface of the aforementioned cylindrical supporting part is tapered so that the diameter is reduced as it comes closer to the lens part, and the taper angle of this tapered surface is preferred to be 3 degrees or more. For example, it is possible to provide a minute irregular shape on the inner peripheral surface of the supporting part in order to scatter the unwanted light reflected by the supporting part if this light does not contribute to image formation. In this case, mold-releasing property may be deteriorated. To solve this problem, the taper angle of the aforementioned tapered surface is increased to 3 degrees or more. This improves mold-releasing property in injection molding operation.

(Structure 3-(2))

An image pick-up apparatus comprising:

an image pick-up device further comprising an photo-electric conversion unit;

an lens part; and a supporting part extending from the periphery of the lens, this supporting part formed in the direction of optical axis of the lens part;

wherein the lens part and supporting part are integrally molded in one piece by injection of the plastic material, the supporting part is formed in a tubular shape extending in the direction of optical axis of the lens part, and the tip of the supporting part is formed in the vicinity of the focusing position of the lens.

According to the image pick-up apparatus of Structure 3-(2), the lens is protected against external force by the highly rigid tubular supporting part, and can be supported. Further, this allows precision fitting between the focusing position of the lens and the photo-electric conversion unit of the image pick-up device, for example, by contacting the tip of the supporting part with the top surface of the image pick-up device. Since the image pick-up lens is made of plastic material, it is possible to reduce the fluctuation of the focusing position of the lens caused by temperature change. In other words, the refractive index of the plastic lens is reduced with the rise of temperature. In this case, the focusing position of the lens moves away from the lens.

On the other hand, the supporting part is elongated by the rise of temperature, and this has an effect of reducing the deviation of the focusing position from the photo-electric conversion unit of the image pick-up device. Extension to the vicinity of the focusing position of the lens means that, when there is a slight difference between the top surface of the image pick-up device in contact with the supporting part and the light receiving surface of the photo-electric conversion unit, extension is made up to the position obtained by subtracting (or adding) this difference from (or to) the focusing position.

Furthermore, the supporting part is preferably designed in a cylindrical form, and this allows the mold structure to be simplified when the image pick-up lens is manufactured by injection molding. Also, this profile ensures that flow of material from the gate around the lens at the time of injection molding is not easily blocked, and effectively prevents unsymmetrical geometric error from occurring on the lens surface.

The image pick-up apparatus has a lens frame containing the image pick-up lens, and the supporting part of the image pick-up lens has a fitting portion for positioning in the direction perpendicular to the optical axis by fitting with the lens frame. This feature ensures easy positioning in the direction perpendicular to the optical axis, and is preferred.

Further, the supporting part has a contacting portion which contacts the image pick-up device. This structure ensures precision fitting between the photo-electric conversion unit of the image pick-up device and focusing position of the lens.

The supporting part is shaped in such a way that the optical axis of the lens part is perpendicular to the top surface of the image pick-up device when the tip is mounted on the image pick-up device. Even if there is a point contact between the image pick-up lens and lens frame containing it, this structure allows the image pick-up lens to be held without play by driving the image pick-up lens toward the image pick-up device.

If the percentage of saturated water absorption of the image pick-up lens does not exceed 1.2% (more preferably 0.7%), the change of the focusing position due to moisture absorption can be reduced.

Furthermore, when the supporting part is made of light-proof plastic material, it is possible to prevent unwanted light from passing through the peripheral surface of the supporting part to reach the surface where an image is formed. This protects the image quality against adverse effects.

The inner peripheral surface of the aforementioned supporting part is tapered so that the diameter is reduced, as it is closer to the lens part. When the taper angle of this tapered surface is 3 degrees or more, mold-releasing property in injection molding operation can be improved.

The aforementioned image pick-up device used in the present invention may be designed in such a way that a protective member made up of such a parallel plate as glass plate is provided at least partly on the light receiving surface. In this case, the supporting part is engaged with the image pick-up device via this protective member.

(Structure 4-(1))

An image pick-up lens molded of plastic material comprising:

a lens part; and a supporting part extending in the direction of optical axis with respect to the lens;

wherein the supporting part has a positioning surface used for positioning with respect to the focusing position of the image pick-up lens, and the image pick-up lens has formed in such a way that the split portion of the mold is located on other than the positioning surface at the time of molding.

Even when burrs have occurred along the split portion of the mold at the time of molding, this structure prevents such burrs from protruding out of the positioning surface. If these burrs protrude from the positioning surface, these burrs will be located between the positioning surface and the reference surface for focusing position where it is mounted, and the focusing position will be displaced by the amount equivalent to the burrs protruding therefrom, with the result that image quality will be deteriorated. However, this problem can be solved by the Structure 4-(1). Further, if burrs protrude from the positioning surface, they will be broken to become dust or dirt when the positioning surface is mounted on the reference surface for the focusing position. Such dust or dirt may be deposited on the lens and image pick-up device. Such a problem can be solved by the Structure 4-(1).

Furthermore, when the focusing position of the image pick-up lens is located on the plane surface including the positioning surface, the focusing position can be easily adjusted.

The inner peripheral surface of the aforementioned supporting part is tapered so that the diameter is reduced as it comes closer to the lens, and the taper angle of this tapered surface is preferred to be 3 degrees or more. For example, it is possible to provide a minute irregular shape on the inner peripheral surface of the supporting part in order to scatter the unwanted light reflected by the supporting part it this light does not contribute to image formation. In this case, mold-releasing property may be deteriorated. To solve this problem, the taper angle of the aforementioned tapered surface is increased to 3 degrees or more. This improves mold-releasing property in injection molding operation.

(Structure 4-(2))

An image pick-up lens molded of plastic material comprising:

a lens part; and a supporting part extending in the direction of optical axis of the lens part;

wherein the supporting part is formed on the end thereof, and has a positioning surface used for positioning with respect to the focusing position of the image pick-up lens, and the aforementioned supporting part has a thickness of the portion provided with the positioning surface in the direction perpendicular to the optical axis smaller than that of other portions of the supporting part. This structure allows the split portion of the mold to be separated from the positioning surface. So even if burrs have occurred along the split portion of the mold at the time of molding, this structure makes it possible to ensure that such burrs will not protrude from the positioning surface. If these burrs protrude from the positioning surface, these burrs will be located between the positioning surface and the reference surface for focusing position where it is mounted, and an error will occur to the focusing position by the amount equivalent to the burrs protruding therefrom, with the result that image quality will be deteriorated. However, this problem can be solved by the Structure 4-(2).

Further, if burrs protrude from the positioning surface, they will be broken to become dust or dirt, for example, when the positioning surface is mounted on the reference surface for the focusing position. Such dust or dirt may be deposited on the lens and image pick-up device. Such a problem can be solved by the Structure 4-(2).

When the supporting part is provided with a convex portion protruding in the direction of optical axis, and a positioning surface is formed on this convex portion, it becomes easier to eliminate the need of providing a split portion of the mold on the positioning surface at the time of molding.

If the inner peripheral surface of the aforementioned supporting part is tapered so that the diameter is reduced as it comes closer to the lens part, and the taper angle of this tapered surface is 3 degrees or more, mold-releasing property in injection molding operation can be improved.

(Structure 4-(3))

An image pick-up apparatus comprising:

a image pick-up device comprising a light receiving unit (also called a photo-electric conversion unit); and an image pick-up lens molded of plastic material comprising:

a lens part, and a supporting part extending in the direction of optical axis with respect to the lens;

wherein the supporting part has a positioning surface used for positioning with respect to the focusing position of the image pick-up lens, and the image pick-up lens has formed in such a way that the split portion of the mold is located on other than the positioning surface at the time of molding. So even if burrs have occurred along the split portion of the mold at the time of molding, this structure makes it possible to ensure that such burrs will not protrude from the positioning surface. If these burrs protrude from the positioning surface, these burrs will be located between the positioning surface and the reference surface for focusing position where it is mounted, and an error will occur to the focusing point by the amount equivalent to the burrs protruding therefrom, with the result that image quality will be deteriorated. However, this problem can be solved by the Structure 4-(3).

When the focusing point of the image pick-up lens is the light-receiving unit (photo-electric conversion unit) of the image pick-up device, the focusing point can be easily adjusted by contacting the positioning surface to the pick-up device.

The aforementioned inner peripheral surface of the supporting part is tapered so that the diameter is reduced as it comes closer to the lens part, and the taper angle of this tapered surface is 3 degrees or more. This improves mold-releasing property in injection molding operation.

(Structure 4-(4))

An image pick-up apparatus comprising:

a image pick-up device comprising a light receiving unit (also called a photo-electric conversion unit); and an image pick-up lens molded of plastic material comprising:

a lens part, and a supporting part extending in the direction of optical axis with respect to the lens;

wherein the supporting part of the image pick-up lens has a positioning surface used for contacting the image pick-up device, and the aforementioned leg has a thickness of the portion provided with the positioning surface in the direction perpendicular to the optical axis smaller than that of other portions of the supporting part.

Even if burrs have occurred along the split portion of the mold at the time of molding, this structure makes it possible to ensure that such burrs will not protrude from the positioning surface. If these burrs protrude from the positioning surface, these burrs will be located between the positioning surface and the reference surface for focusing position where it is mounted, and an error will occur to the focusing position by the amount equivalent to the burrs protruding therefrom, with the result that image quality will be deteriorated. However, this problem can be solved by the Structure 4-(4). Further, if burrs protrude from the positioning surface, they will be broken to become dust or dirt when the positioning surface is mounted on the reference surface for the focusing position. Such dust or dirt may be deposited, for example, on the lens and image pick-up device. Such a problem can be solved by the Structure 4-(4).

When the focusing point of the image pick-up lens is the light-receiving unit (photo-electric conversion unit) of the image pick-up device in contact with the positioning surface, the focusing point can be easily adjusted by contacting the positioning surface to the pick-up device.

The aforementioned inner peripheral surface of the supporting part is tapered so that the diameter is reduced as it comes closer to the lens part, and the taper angle of this tapered surface is 3 degrees or more. This improves mold-releasing property in injection molding operation.

(Structure 4-(5))

A method for forming an image pick-up lens having a lens part and a supporting part extending in the direction of optical axis of the lens part, comprising a step of relatively moving first mold for molding the end of the supporting part and a second mold for molding the optical surface on the end of the supporting part in the aforementioned lens in the direction of optical axis, thereby performing molding operation in such a way that the end of the supporting part is placed in a predetermined positional relationship with the focusing point of the lens.

This method provides easier adjustment of the end of the supporting part to the focusing point of the lens, as compared to the case where the lens and supporting part are molded by a single mold or by multiple molds which cannot make a relative movement in the direction of optical axis. Merely placing it on the image pick-up device allows the image pick-up lens to be molded, which permits precision adjustment of the focusing point to the photo-electric conversion unit.

DETAILED DESCRIPTION OF THE PREFERRED EMBODIMENT

Figure 1:
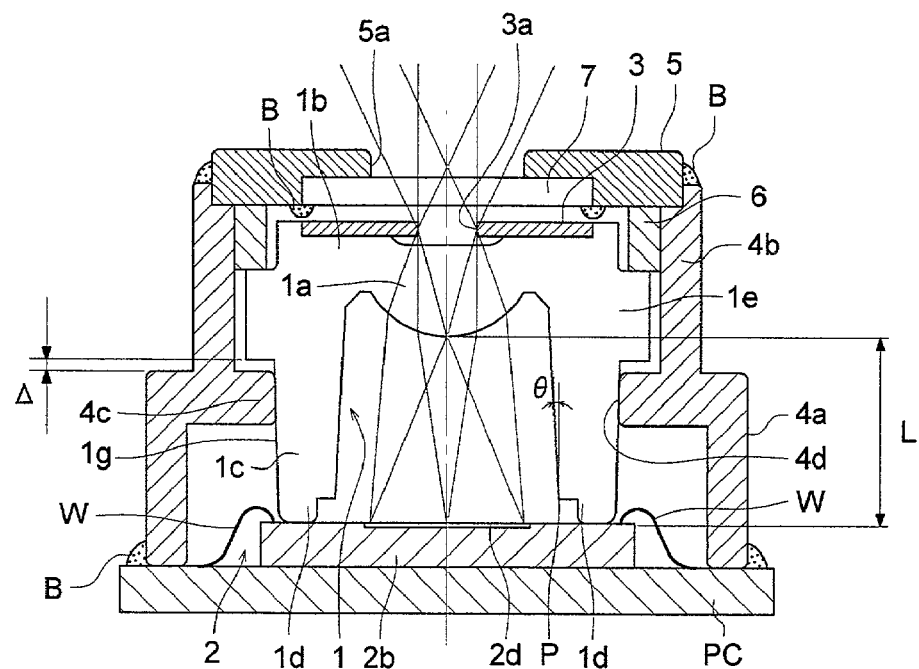
FIG. 1(a) is a cross sectional view of the image pick-up apparatus according to the present invention.
FIG. 1(b) is anther cross sectional view of the image pick-up apparatus according to the present invention.
Figure 1:
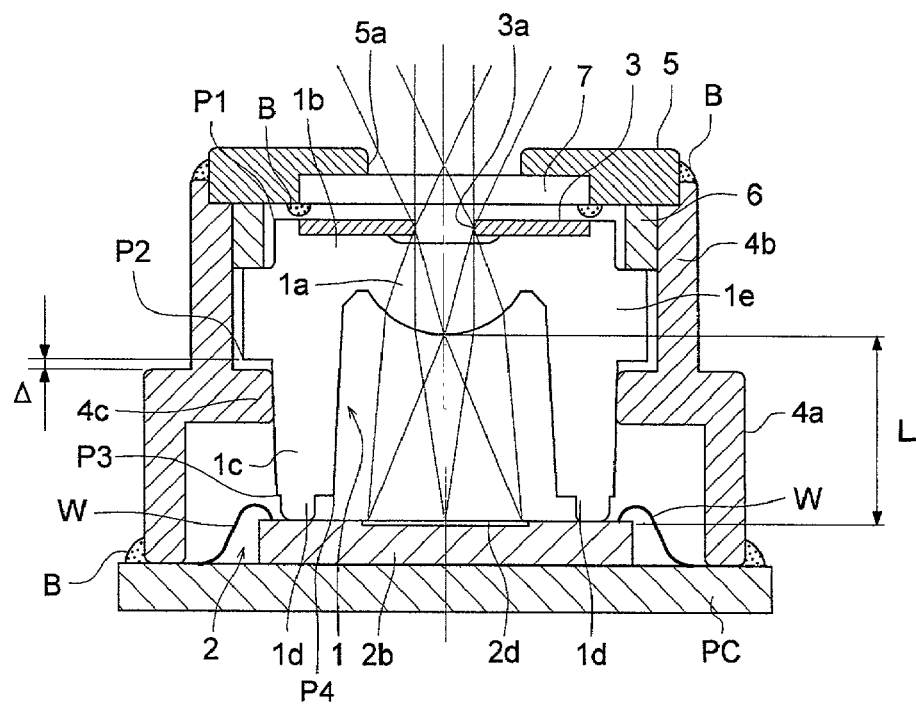
Figure 2:
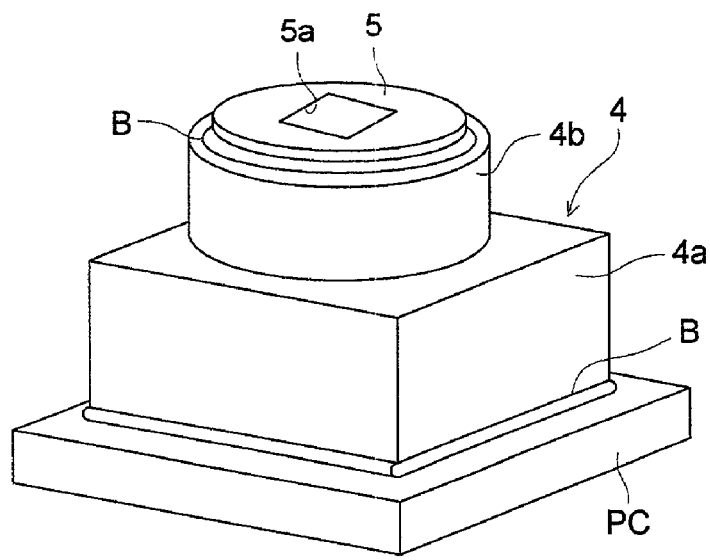
FIG. 2 is a perspective view of the image pick-up apparatus according to the present invention.
Figure 3:
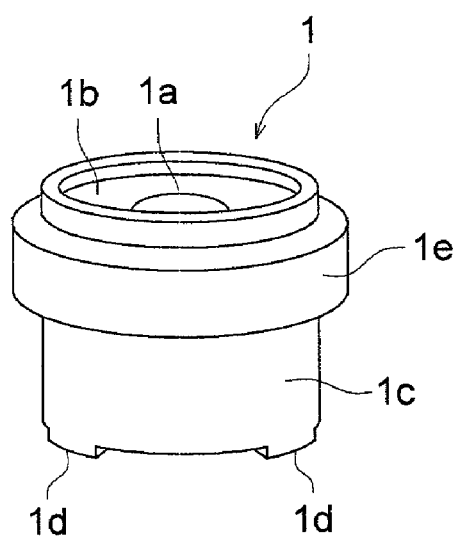
FIG. 3 is a perspective view of the image pick-up lens according to the present invention.
Figure 4:
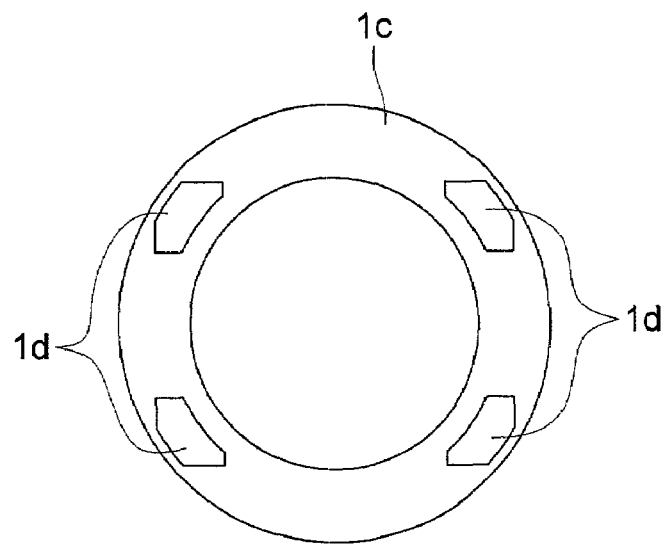
FIG. 4(a) is a bottom view of the image pick-up lens according to the present invention.
FIG. 4(b) is another bottom view of the image pick-up lens according to the present invention.
FIG. 4(c) is a further bottom view of the image pick-up lens according to the present invention.
FIG. 4(d) is a still further bottom view of the image pick-up lens according to the present invention.
Figure 4:
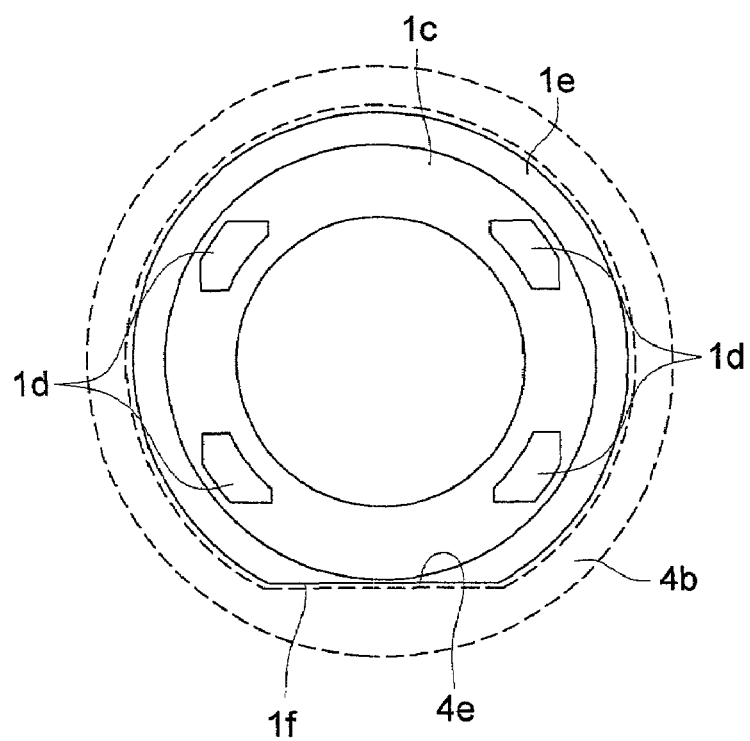
Figure 4:
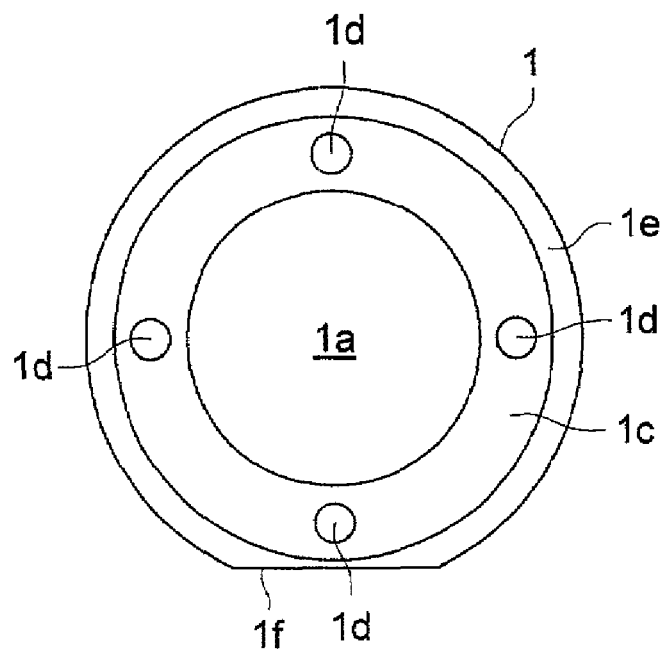
Figure 4:
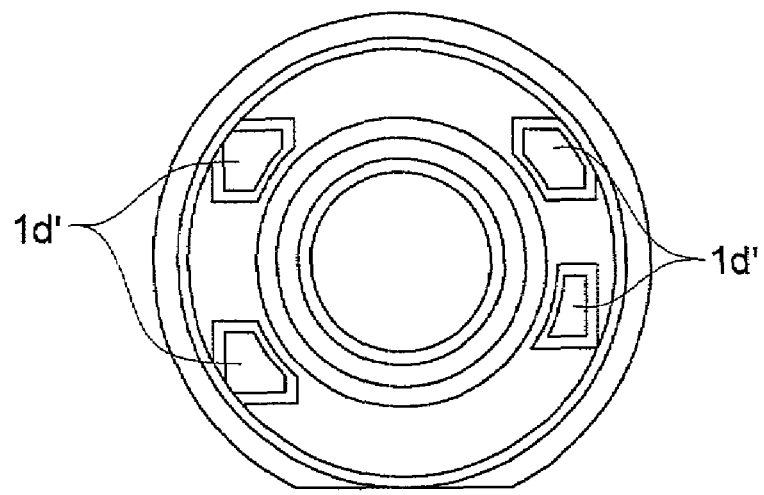
Figure 5A:
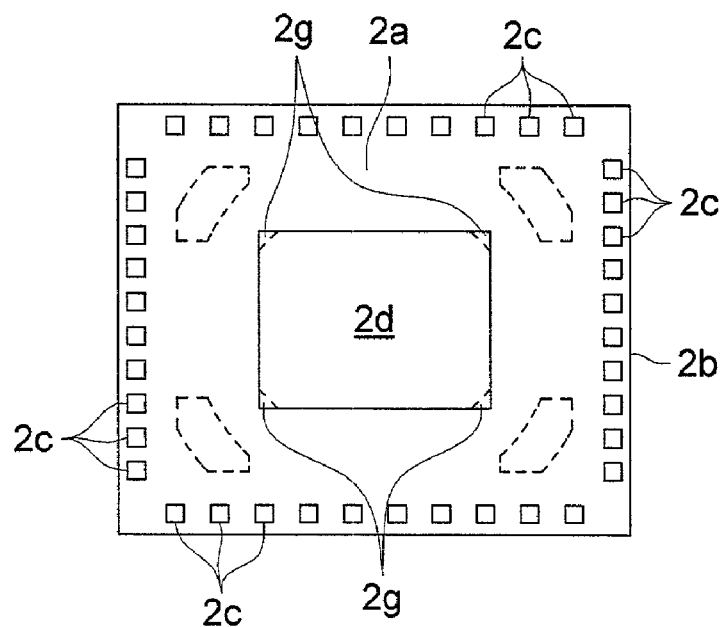
FIG. 5(a) is a top view of the image pick-up device according to the present invention.
Figure 5B:
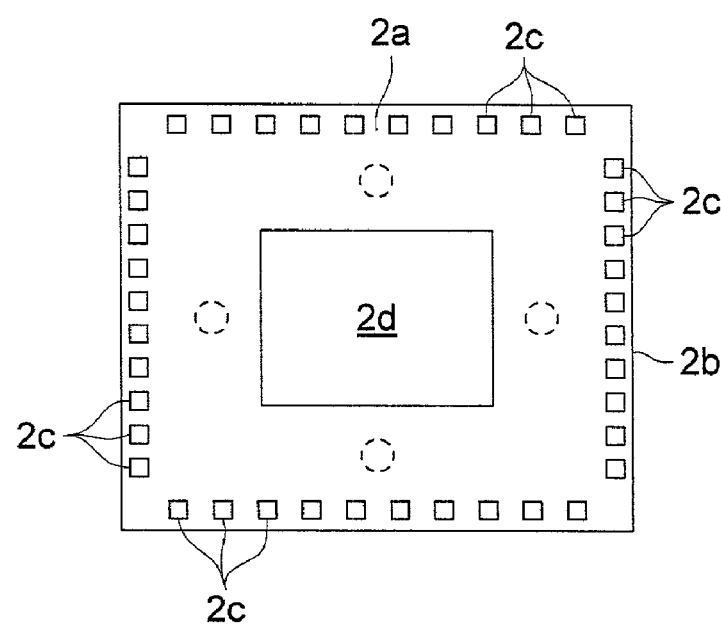
FIG. 5(b) is another top view of the image pick-up device according to the present invention.
Figure 6:
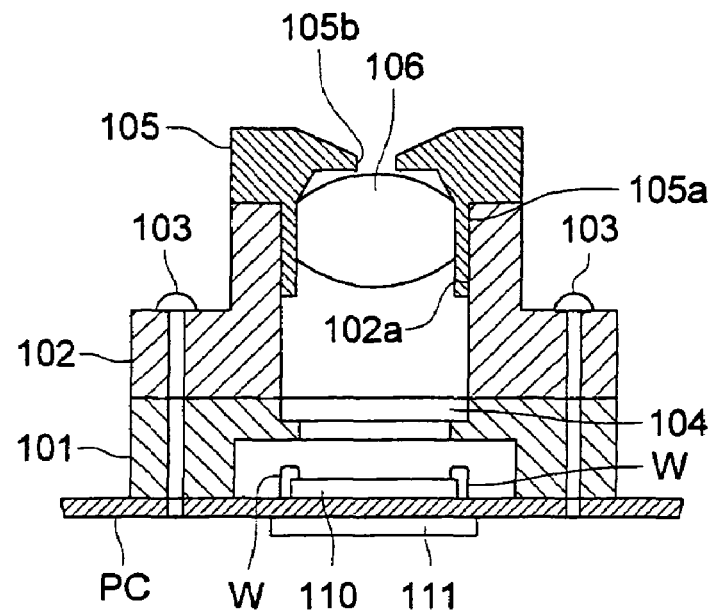
FIG. 6 is a cross sectional view representing an example of the image pick-up apparatus according to the prior art.

The following describes the preferred embodiments according to the present invention with reference to drawings:

Each of FIGS. 1(a) and 1(b) is a cross sectional view of the image pick-up apparatus as an embodiment of the present invention. FIG. 2 is a perspective view of the image pick-up apparatus given in FIG. 1. FIG. 3 is a perspective view of the image pick-up lens. Each of FIGS. 4(a) to (d) is a bottom view of the image pick-up lens. Each of FIGS. 5(a) and 5(b) is a top view of the image pick-up device.

The image pick-up lens is made of transparent plastic material, and, as shown in FIG. 1, comprises a cylindrical supporting part 1c, four contact portion ld formed on the tip of a supporting part 1c as its component thereof, a flange 1e formed around the top end of the supporting part 1c, a plate-formed top surface 1b blocking the top end of the supporting part 1c, and a convex lens 1a formed at the center of the top surface 1b, which are integrally formed in one piece. The substantially cylindrical flange part 1e is partly notched as an engagement section for positioning in the direction intersecting the optical axis, as shown in FIGS. 4(b) to (d). It is preferred to form a D-cut portion 1f. The supporting part 1c is preferred to be arranged inside (on the side closer to the optical axis)) in the direction at right angles to the optical axis, even when the cut portion 1f is included. When the gate at the time of injection is arranged on the outer periphery (not illustrated) of the flange part 1e, effective flow of the resin to the lens 1a is ensured. A aperture plate 3 having an opening 3a as a first aperture for defining the F-number of the convex lens 1a is bonded on the upper surface of the top surface 1b around the convex lens 1a by an adhesive or the like.

A lens frame 4 consisting of lightproof material is arranged outside the image pick-up lens 1. As is apparent from FIG. 2, the lens frame 4 is provided with a rectangular bottom 4a and a cylindrical top 4b. The lower end of the bottom 4a contacts the top of a base board PC, and is bonded together by an adhesive B. The side surrounding the upper surface of the bottom 4a is covered with a partition 4c, and the cylindrical inner peripheral surface 4d of the partition 4c is fitted closely with the outer peripheral surface 1g (fitting portion) of the supporting part 1c of image pick-up lens 1. Accordingly, lens 1a can be positioned accurately in the direction perpendicular to the optical axis with respect to the photo-electric conversion unit 2d of the image pick-up device 2b to be described later, merely by positioning the base board PC and lens frame 4 using an optical sensor (not illustrated) or the like mounted on a automatic assembling machine.

A lightproof plate 5 is bonded onto the upper end of the top 4b of the lens frame 4 by adhesive B. An opening 5a as a second aperture is located at the center of the lightproof plate 5. A filter 7 consisting of a infrared ray absorbing material is bonded below the opening 5a of the lightproof plate 5 by adhesive B. A cover is formed by the lightproof plate 5 and filter 7.

In FIG. 1, an elastic member 6 comprising a rubber or the like is arranged between the lightproof plate 5 and flange part 1e of the image pick-up lens 1, and is subjected to elastic deformation when the lightproof plate 5 is mounted on the lens frame 4. The image pick-up lens 1 is pressed downward by this elastic force in FIG. 1. Accordingly, the force of the lightproof plate 5 is transmitted to the base board PC, but not directly to the image pick-up device 2b. The elastic member 6 is preferred to be a coil spring which ensures stable elastic force for a long period of time. When the elastic member 6 is formed integrally with the aperture plate 3, the number of component parts can be reduced.

In FIGS. 5(a) and (b), the image pick-up unit 2 comprises of an image pick-up device 2b such as a CMOS (Complementary Metal Oxide Semiconductor) type image sensor or CCD type image sensor. The lower surface of the rectangular thin-plate image pick-up device 2b is installed on the upper surface. The photo-electric conversion unit 2d with pixels arranged in two-dimensional terms is formed at the center of the upper surface of the image pick-up device 2b. In the surrounding there is formed a surrounding surface 2a which is located inside the image pick-up device 2b with an image processing circuit formed therein. Multiple pads 2c are arranged in the vicinity of the periphery of a surrounding area 2a intersecting so as to be perpendicular to the thin side surface. A pad 2c as a wiring terminal is connected to the base board PC via a wire W, as shown in FIGS. 1(a) and (b).

Further, the contacting portion 1d of the image pick-up lens 1 is designed in a shape shown in FIGS. 4(a) to (d). It is protruded from the lower end of a supporting part 1c to form part of the supporting part 1c. In other words, the contact portion 1d is provided discontinuously in the circumferential direction of the supporting part 1c. In the present embodiment, only the contact portion 1d is arranged in contact inside the pad 2c in the surrounding area 2a of an image pick-up device 2b, as shown by the dotted line of FIGS. 5(a) and (b). Accordingly, for surface parallelism, it is sufficient that only the lower surface of the contact portion 1d is maintained within a predetermined range. Here a circuit (not illustrated) of the image pick-up device (including a signal processing circuit) is provided on the back of the surrounding surface 2a (on the lower surface side in FIG. 1). Through the contact of the contact portion 1d, means are provided to ensure that circuit processing is not affected.

The following discusses the contact position of the contact portion 1d. For example, a corner 2g of the photo-electric conversion unit 2d shown in FIG. 5(a) becomes an area independent of image formation if the effective pixel area is made slightly smaller than the entire pixel area. In this case, it can be said that there is little impact of the image pick-up device 2b on the image pick-up performance even inside the photo-electric conversion unit 2d, even though the contact portion 1d is brought in contact with the area of the corner 2g. Regardless of whether contact is made with the surrounding area 2a or photo-electric conversion unit 2d, the load from the contacting portion 1d is preferred not to exceed 500 grams (with the surface pressure of 1000 g/mm$^2$ or less). If this load is exceeded, the image pick-up device 2b may be damaged. When consideration is given to wobbling of the image due to vibration or others, the load from the contacting portion 1d is preferred to be 5 grams or more.

According to the embodiment of the present invention, the supporting part 1c extends to the vicinity of the focusing point of the convex lens 1a from the convex lens 1a in a cylindrical form in the direction of optical axis. So the convex lens 1a is protected against external force by the highly rigid cylindrical supporting part 1c, and is supported. Moreover, the focusing point of the convex lens 1a and the photo-electric conversion unit 2d can be adjusted accurately by contacting the contacting portion 1d as an end of the supporting part 1c to the surrounding surface 2a of the image pick-up device 2a.

Furthermore, the supporting part 1c is designed in a cylindrical form, and this allows the mold structure to be simplified when the image pick-up lens is manufactured by injection molding. Also, this profile ensures that flow of material from the gate (not illustrated) around the convex lens 1a at the time of injection molding is not easily blocked, and effectively prevents unsymmetrical geometric error from occurring on the convex lens 1a.

The supporting part 1c is preferred to have a contacting portion 1d as an end portion whose thickness in the direction perpendicular to optical axis is smaller than that of the cylindrical portion. If the split portion of the mold of the image pick-up lens is placed at the portion having greater thickness than that of the contact portion 1d (point P in Fig. 1(a), for example), this structure eliminates the possibility of burrs occurring between the contacting portion 1d and the surrounding surface 2 of the image pick-up device 2b, even if burrs have occurred along the split portion of the mold at the time of molding.

In FIG. 4(c), the contacting portion whose lower end surface serves as a positioning surface is formed in a cylindrical convex which is located farther from optical axis than the inner diameter (the minimum dimension in the direction intersecting the optical axis) in supporting part 1c, and is located closer to optical axis than the outer diameter (the maximum dimension in the direction intersecting the optical axis) in supporting part 1c.

As shown in FIGS. 4(a) to (d), the spatial plane surface including each end face of the contacting portion 1d is arranged so as to be perpendicular to the optical axis and the gravity center of the image pick-up lens 1 is arranged within the area enclosed by each end face. This structure allows the image pick-up lens 1 to be supported with the optical axis of the convex lens 1a perpendicular to this plane surface, when the image pick-up lens 1 is mounted on the plane surface as a single unit. This structure permits the image pick-up lens 1 to stand upright, for example, with the contacting portion 1d kept in contact with the plane surface at the time of assembling. This is convenient because there is no need of using a support base.

The image pick-up lens 1 can be maintained without play in the presence of vibration if the image pick-up lens 1 is pushed toward the image pick-up device 2b by means of an elastic member 6 when the image lens 1 is built in the lens frame 4.

The inner peripheral surface is tapered so that the diameter is reduced as it comes closer to the lens, and the taper angle (θ in FIG. 1) of this tapered surface is preferred to be 3 degrees or more. It may be possible to provide a minute irregular shape on the inner peripheral surface of the supporting part 1c in order to scatter the unwanted light reflected by the supporting part 1c when this light does not contribute to image formation. However, this may deteriorate mold-releasing property on the inner peripheral surface. To solve this problem, the taper angle of the tapered surface is increased to 3 degrees or more in the present embodiment. This improves mold-releasing property in injection molding operation.

According to the present embodiment, a gap Δ is formed between the lower surface of the flange part 1e of the image pick-up lens 1 and partition 4c of the bottom 4a of the lens frame 4 with the contacting portion 1 kept in contact with the surrounding surface 2a of the image pick-up device 2b. So the distance L between the lens 1a and the photo-electric conversion unit 2d of the image pick-up device 2b (positioning in the direction of optical axis) can be accurately set by the length of the leg 1c. According to the present embodiment, four contacting portions are provided, but the number may be reduced to one to three. Further, the contacting portion may be a strap-formed one along the cylindrical supporting part 1c of the image pick-up lens 1 if interference with a pad 2c can be avoided. The contacting portion need not always be formed in a cylindrical shape or at an equally spaced interval. It can be formed in an unsymmetrical profile as exemplified by the contacting portion 1d' in FIG. 4(d).

When the image pick lens 1 is made of plastic material, it is possible to minimize the deviation of the focusing position caused by changes refractive index of the lens in the event of temperature change. That is, the refractive index of the plastic lens is decreased with the rise of temperature, and a change occurs in such a way that the focusing point is removed away from the lens. In the meantime, the supporting part 1c is stretched by the rise of temperature, and this property has the effect of reducing deviation of the focusing point. The image pick-up lens 1 according to the present invention is made of plastic material having a comparatively small specific gravity. It is lighter than glass with the same volume, and has a superb impact absorbing property. This feature provides an advantage of minimizing the possible damage of image pick-up device 2b when the image pick-up device is dropped inadvertently.

When the structure is shown in FIG. 5(a), the contacting portion 1d will interfere with the pad 2c if the image pick-up lens 1 makes a free rotation in the lens frame 4. To avoid this, it is preferred to adopt the structure which allows assembling with rotation suspended (e.g. a rotation stopper installed on the lens frame 4). Accordingly, a D-cut portion if is used as a rotation stopper in the present embodiment. To put it more specifically, a semicircular portion 4e protruding toward the inner peripheral side is formed on part of the upper half portion 4b of the lens frame 4 shown by the dotted line, in conformity to the D-cut portion if of the flange part 1e of the image pick-up lens 1, as shown in FIG. 4(b). If the image pick-up lens 1 and lens frame 4 make an attempt to make a relative rotation from the position shown in FIG. 4(b), there is interference between the D-cut portion if and semicircular portion 4e, thereby blocking this relative rotation.

The following describes the operation of the embodiment of the present invention: The lens 1a of the image pick-up lens 1 allows the image of a object to be formed on the photo-electric conversion unit 2d of the image pick-up device 2b. The image pick-up device 2b is designed to be capable of converting electric signals into the image signal, etc. in response to the amount of received light, and outputting them via the pad 2c and wire W.

In the embodiment of the present invention, the image pick-up lens 1 is mounted on the surrounding surface 2a of the image pick-up device 2b, not on the base board PC. This eliminates the need of adjusting the focusing point of the lens 1a at the time of assembling by controlling the dimensional accuracy of the supporting part 1c (including the contact portion 1d) of the image pick-up lens 1, namely the accuracy of the aforementioned distance L.

The image pick-up apparatus of the present invention has no focus adjustment function, so it is preferred to use a pan-focus lens which provides focus adjustment from the object in the distance to the one at a short distance. It becomes possible to regard, from an infinite distance in terms of geometrical optics, that an object at a distance of U/2 is placed in focus, by matching the positions in the direction of optical axis between the image point of the lens 1a and photo-electric conversion unit 2d of the image pick-up device 2b at the hyperfocal distance $U \approx f^2/(F \times 2P)$ (where f denotes a lens focal distance, F a F-number of the lens, P a pixel pitch of the image pick-up device).

For example, the focus is adjusted up to a distance of about 0.17 meters from an infinite distance, if the aforementioned distance L is set in such a way that there is a match of the positions at the direction of optical axis between the image point of the lens 1a at the hyperfocal $U \approx f^2/(F \times 2P) = 0.33$ as a reference object distance when f=3.2 mm, F=2.8 and P=0.0056 mm, and the photo-electric conversion unit 2d of the image pick-up device 2b. Further, it is not always necessary to use an object at hyperfocal distance as a reference object. For example, when one wishes to put priority to the image quality in the long distance, one has to set the reference object distance beyond the hyperfocal distance. (To put it more specifically, the distance L should be shorter).

Regarding the accuracy of distance L, in order to eliminate the need of adjusting the focusing point of the lens as a pan-focus lens, the deviation in the direction of optical axis between the photo-electric conversion unit 2b and image point in the reference object distance of lens 1a must be kept at about $\pm 0.5 \times (F \times 2P)$ (where F denotes the F-number of the image pick-up lens in terms of equivalent shear force and P a pixel pitch of image pick-up device). More preferably, this deviation is kept at about $\pm 0.25 \times (F \times 2P)$. If this value is excessive, the image quality at an infinitely long distance or at close range will be deteriorated.

The F-number is one of the quantities representing brightness in an optical system, and is represented by the value obtained by dividing the equivalent focal distance of the lens by the entrance pupil diameter. For example, when the focal distance is 100 mm and the entrance pupil diameter is 50 mm, the F-number is 2 (See the Dictionary of Optronics Terminology).

To put it more specifically, in the present embodiment, the image pick-up lens 1 is designed in such a shape as to ensure matching of positions in the direction of optical axis between the image point position (focusing position) of lens 1a at a reference object distance of 500 mm, and the lower surface of the contacting portion 1d. This provides a structure of an image pick-up device which ensures matching between the image point of lens 1a and the photo-electric conversion unit 2d. Actually, however, there are production errors such as a surface profile error of the lens 1a of the image pick-up lens 1, refractive index error and dimensional error of the supporting part 1c (including the contacting portion 1d). These production errors are taken into account and the deviation between the image point of lens 1a (focusing point) and the lower surface of the contacting portion 1d in the direction of optical axis is kept at or below the aforementioned $\pm 0.5 \times (F \times 2P)$.

The following show specific numerals: Assume that the F-number is 2.8 and the pixel pitch P of the photo-electric conversion unit 2d of the image pick-up device 2b is 0.008 mm, as the embodiment of lens 1 shown later in Tables 1 and 2. It is necessary to keep the deviation at or below the following:

$$\pm 0.5 \times (F \times 2P) = \pm 0.5 \times 2.8 \times 2 \times 0.008 \approx \pm 0.022 \text{ mm}$$

Further, in order to get higher picture quality, it is preferred to keep the deviation at or below half this value. The image point position (focusing position) according to this invention is defined as a position which provides excellent images at the center and in the peripheral area, with consideration given to the curvature of the image surface. The example described above is based on the assumption that there is no level difference between the photo-electric conversion unit 2d of the image pick-up device 2b and peripheral surface 2a. If there is any level difference between the photo-electric conversion unit 2d and peripheral surface 2a, the length of the supporting part 1c (including the contacting portion 1d) is increased or decreased the amount corresponding to the level difference, thereby matching the image point position (focusing point) of the lens 1a.

In the present embodiment, the contacting portion 1d of the supporting part 1c of the image pick-up lens 1 contacts the surrounding surface 2a of the image pick-up device 2b, whereby positioning is performed between the lens 1a and the photo-electric conversion unit 2d of the image pick-up device 2b in the direction of optical axis. When the lens frame 4 is installed on the base board PC, positioning is performed between the lens 1a and the photo-electric conversion unit 2d of the image pick-up device 2b in the direction of optical axis. This feature ensures high positioning accuracy at a lower cost.

When the pad 2c and wire W are formed on the surrounding surface 2a of the image pick-up device 2b for connection between the image pick-up device 2b and base board PC, the contacting portion 1d can have a greater contact area while the image pick-up device 2b is kept in a compact configuration, if the contacting portion 1d of the supporting part 1c is arranged so as to contact the peripheral surface 2a on the side of the photo-electric conversion unit 2d rather than the pad 2c. This stabilizes the image pick-up lens 1, and keeps the pressure of the contact surface at a low level. This arrangement protects the image pick-up device 2b, avoids interference with the pad 2c and wire W and ensures high precision positioning. The lens frame 4 is bonded to the base board PC, and is kept sealed against outside the image pick-up device together with other two bonded portions in such a way that the foreign substances will not enter, thereby preventing an adverse effect of foreign substances upon the photo-electric conversion unit 2d of the image pick-up device 2. The adhesive is preferably provided with moisture proof treatment. This will prevent the surface of the image pick-up device or pad from being deteriorated.

In the present embodiment, it is preferred to provide an elastic member 6 for pressing the lens 1a against the lens frame 4 in the direction of optical axis. Further, the elastic member 6 is preferably a coil spring which applies pressure to the flange 1e of the image pick-up lens 1 in the direction of optical axis at a predetermined force. Thus, the lens can be pressed in the direction of optical axis at a proper contact force (equivalent to the aforementioned load from 5 to 500 grams) using the elastic force of this elastic member 6, without undue stress being applied to the surrounding area 2a of the image pick-up device 2b with a built-in circuits and devices, or without the image pick-up lens 1 being unsteady due to vibration. Even if an excessive force is applied in the direction of optical axis of the lens frame 4, the force is transmitted to the base board PC, but not directly to the image pick-up device 2b. This provides an advantage of protecting the image pick-up device 2b. Urethane or sponge can be used as the elastic member 6, but use of a coil spring is more preferred because it ensures a long-term stable elastic force.

A cover member comprising a lightproof plate 5 and filter 7 is arranged on the side of a object rather than the lens 1a. This arrangement protects the lens 1a without allowing it be exposed to the outside, and prevents foreign substances from being deposited on the lens surface. Further, the filter 7 is made of the material provided with infrared absorption characteristics without the need of installing a separate infrared ray cutting filter, thereby cutting the number of parts to be used. Instead of using the filter 7 having a infrared ray cut-off characteristics, it is also possible to form the image pick-up lens 1 out of a material having infrared absorbing characteristics, or to coat the surface of the lens 1a with a film having a infrared cutting characteristics.

The lens 1 can be inserted into the lens frame 4 from the side of the object, with the lightproof plate removed from the lens frame 4 at the time of assembling. After that, the lightproof plate can be assembled with the lens frame 4. This configuration facilitates assembling of the image pick-up lens 1 and ensures easy assembling in the automatic mode. In this case, if a air vent is provided somewhere on the bottom 4a of the lens frame 4, assembling is facilitated even if there is a very small gap between the lens frame 4 and image pick-up lens 1. Such an air vent, however, is preferably sealed with a filling material subsequent to assembling, thereby preventing the surface of the image pick-up device or pad from being deteriorated by entry of foreign substances or moisture from the outside. The filling material used in this case is preferably a lightproof one in order to avoid light leakage. The image pick-up lens 1 can be inserted after the lens frame 4 has been bonded to the base board PC, or can be bonded to each base board PC for each unit after it has been installed on the lens frame 4. This provides freedom in the production process. When the latter assembling step is followed, the partition 4c of the mirror lens 4 also performs a function of preventing the image pick-up lens 1 from being disconnected.

The supporting part 1c of the image pick-up lens 1 is located close to the photo-electric conversion unit 2d of the image pick-up device 2b, so luminous flux not contributing to the image formation is reflected by the supporting part 1c to enter the photo-electric conversion unit 2d. This gives rise to a concern that ghost or flare may be caused. To avoid this, it is effective to provide a second aperture (opening 5a) for defining the surrounding luminous flux on the object side of the first aperture (opening 3a) for defining the F-number of the lens 1a, thereby minimizing the entry of unwanted light. The angle of view is different on the short or long side or on a diagonal line of the photo-electric conversion unit 2d of the image pick-up device 2b. More effective results can be obtained by making the opening 5a of the second aperture in a rectangular form. In the present embodiment, the opening 5a of the lightproof plate 5 is equipped with this function. It is also possible to form an aperture by coating or applying a lightproof film on the object side of the filter 7, in addition to the required opening. Also, for the same reason, it is preferred to provide internal surface reflection preventive treatment on at least part of the supporting part 1c. The internal surface reflection preventive treatment includes the formation of a surface roughened by providing microscopic asperities to prevent scattering of luminous flux which does not contribute to image formation, or application of reflection preventive coating material or low-reflecting coating material. It is possible to prevent transmitted light from reaching the photo-electric conversion unit 2d of the image pick-up device 2b by making the supporting part 1c out of colored lightproof material.

An aperture plate 3 with an opening 3a is placed on the incident side of the lens 1a, so the luminous flux incident on the photo-electric conversion unit 2d of the image pick-up device 2b can be made to enter at an angle close to a vertical line, i.e. it can be made into light close to telecentric light, thereby obtaining the higher image quality. Further, if the lens 1a is made into a positive lens where the surface of higher curvature is directed to the image side, it is possible to assign a larger space between the aperture (opening 3a) and the principal point of the lens 1a, whereby a preferable configuration close to a telecentric one can be provided. In the present embodiment, the lens 1a is formed in a meniscus profile with the conveying side facing the image side. To ensure higher image, the lens is preferably made of multiple lenses.

Figure 7:
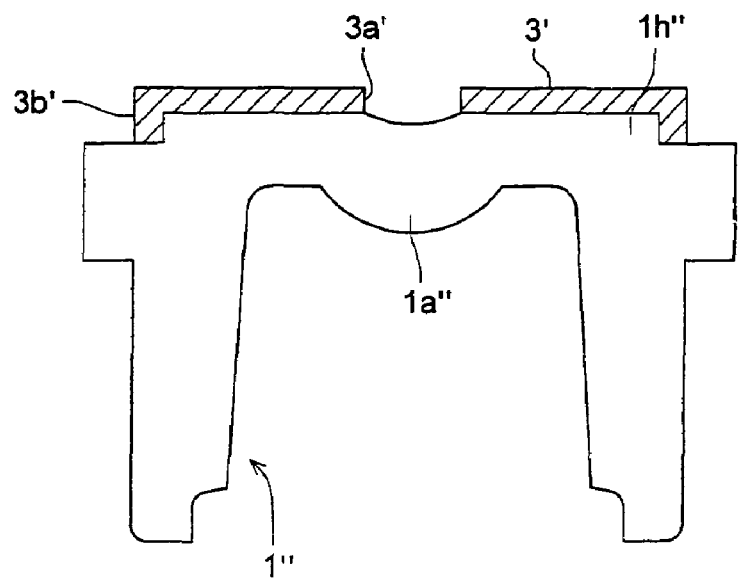
FIG. 7 is a cross sectional view representing an example of a variation of the image pick-up lens according to the present invention.

FIG. 7 is a cross sectional view representing an example of a variation of the image pick-up lens. In FIG. 7, a shoulder 1h protruding in a cylindrical form is provided on the top surface of the image pick-up lens 1, and an aperture plate 3' is provided in such a way that as surrounding cylindrical portion 3b' is fitted to this shoulder 1h". The center of the aperture 3' is equipped with an opening 3a' serving as an aperture.

Figure 8:
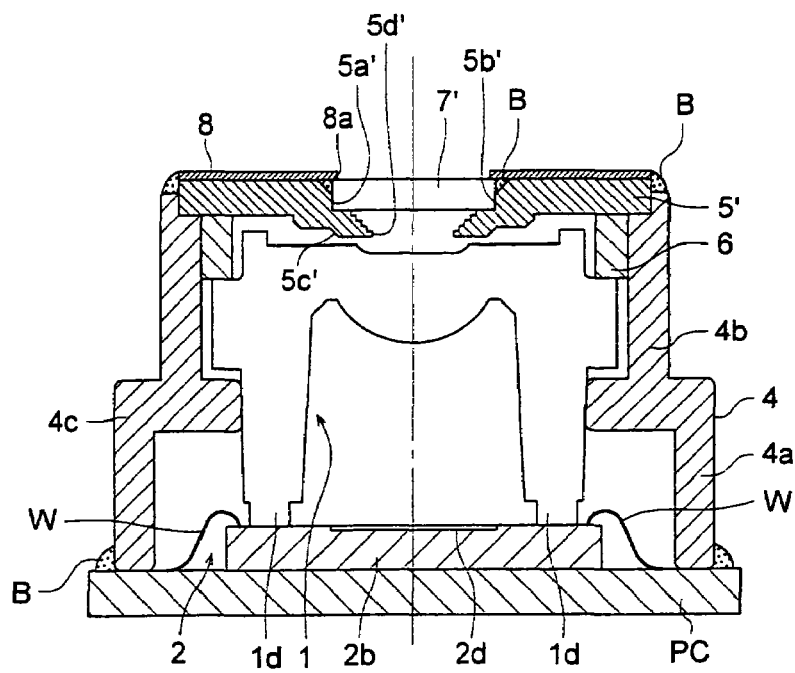
FIG. 8 is a cross sectional view of an image pick-up apparatus.

FIG. 8 is a cross sectional view of an image pick-up apparatus as a second embodiment. The second embodiment is different from the aforementioned embodiment only in that the configuration of the aperture plate and lightproof plate has been changed. The same numerals will be used to denote the same portions in the same configuration including that of the contact portion between the supporting part and image pick-up device, and description will be omitted to avoid duplication.

In FIG. 8, a holding member 5' whose upper surface is covered with a lightproof sheet 8 is installed on the upper end of the top 4b of the lens frame 4 by adhesive B. A filter 7' made of an infrared absorbing characteristics is fitted in the opening 5a' at the center of the holding member 5' comprising a lightproof material. A tapered surface 5b' is formed on the upper edge of the opening 5a' of the holding material 5'. The holding material 5' can be bonded with the filter 7' by applying adhesive B to this position. Further, the holding material 5' is provided with a diameter-reducing portion 5c' protruding below the opening 7a' with its diameter gradually reducing, and the portion of the smallest diameter at the bottom end constitutes a first aperture 5d'. The central opening 8a of the lightproof sheet 8 constitutes a second aperture. The holding member 5', filter 7' and lightproof sheet 8 form a cover member.

In the present embodiment, the cover member comprising the holding member 5', filter 7' and lightproof sheet 8 is arranged on the side of the object rather than the lens 1a of the image pick-up lens 1. This ensures protection of the lens 1a without allowing it to be exposed, and prevents foreign substances from being deposited thereon. This cover member can be molded in an integral piece, whereby reducing the number of parts used.

Similarly to the aforementioned embodiment, the supporting part 1c of the image pick-up lens 1 is arranged close to the photo-electric conversion unit 2d of the image pick-up device 2b, so the luminous flux not used for image formation may be reflected on the supporting part 1c to enter the photo-electric conversion unit 2d and to cause ghost or flare. To eliminate this concern, the present embodiment minimizes entry of unwanted light by arranging the second aperture (opening 8a) for defining the peripheral luminous flux on the object side of the first aperture 5a' for defining the F-number of the lens 1a. The angle of view is different on the short or long side or on a diagonal line of the photo-electric conversion unit 2d of the image pick-up device 2b. More effective results can be obtained by making the opening 5a of the second aperture in a rectangular form.

Figure 9:
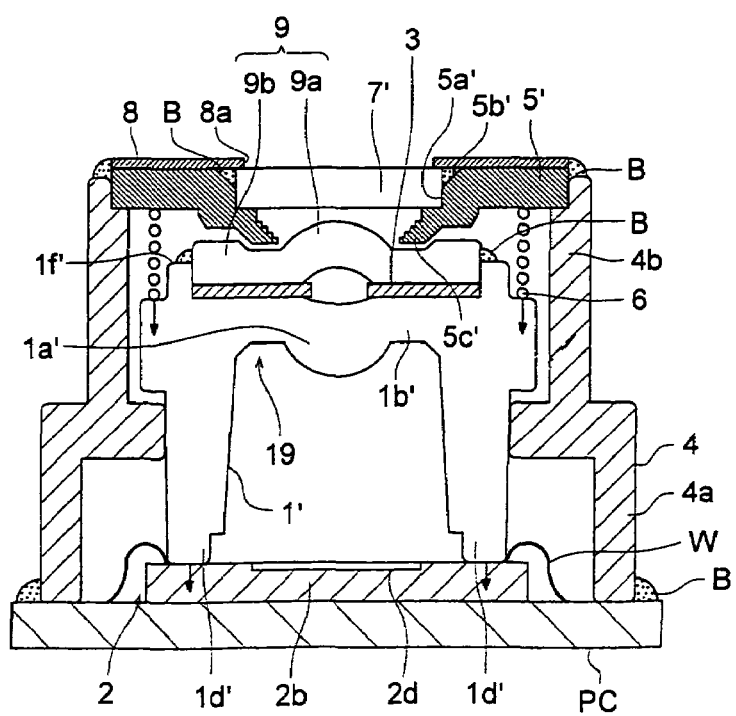
FIG. 9 is another cross sectional view of an image pick-up apparatus.

FIG. 9 is a cross sectional view of an image pick-up apparatus as a third embodiment.

The third embodiment is different from the aforementioned second embodiment only in that the configuration of the image pick-up lens has been changed in such a way that multiple lenses are provided. The same numerals will be used to denote the same portions in the same configuration including that of the contacting portion between the supporting part and image pick-up device, and description will be omitted to avoid duplication.

In FIG. 9, an image lens 19 comprises an image side lens 1' composed of plastic material and object side lens 9. The image side lens 1' is similar in form to the image pick-up lens 1 shown in FIGS. 1(a) and (b), but the height of the ring 1f formed on the upper side in the direction of optical axis is greater. The object side lens 9 is arranged above top surface 1b' inside in the radial direction of the ring 1f via the aperture plate 3 for defining the F-number. The object side lens 9 comprises a flange 9b fitted to the inner periphery of the ring 1f and lens 9a formed at the center. The lens 1a' of the image side lens 1' is a positive lens, while the lens 1a of the object side lens 9 is a negative lens. In the present embodiment, the aperture plate 3 serves as a spacer for defining the lens distance between lens 1a' and 9a.

The inner peripheral surface of the ring 1f of the image side lens 1' and outer peripheral surface of the flange 9b of the object side flange 9 are of the same diameter, and are in parallel to optical axes. The lenses 1a' and 9a can be positioned in the direction of optical axes by the engagement between these surfaces, and these optical axes can be easily aligned. The object side lens 9 is bonded with the image lens 1' by the adhesive B applied thereabout.

The holding member 5' with a thin lightproof sheet 8 bonded thereon is mounted on the upper end of the top 4b of the lens frame 4 using the adhesive B. A filter 7 made of infrared absorbing material is fitted in the opening 5a' at the center of the holding member 5' made of lightproof material. A tapered surface 5b' is formed on the upper edge of the opening 5a' of the holding member 5'. The holding member can be bonded with the filter 7' by applying adhesive B thereto. The holding member 5' is provided with a diameter-reducing portion 5c' protruding below the opening 5' with its diameter gradually reducing, and this portion serves as a lightproof portion for preventing unwanted light from entering. The opening 8a at the center of the lightproof sheet 8 constitutes a second aperture.

Figure 10:
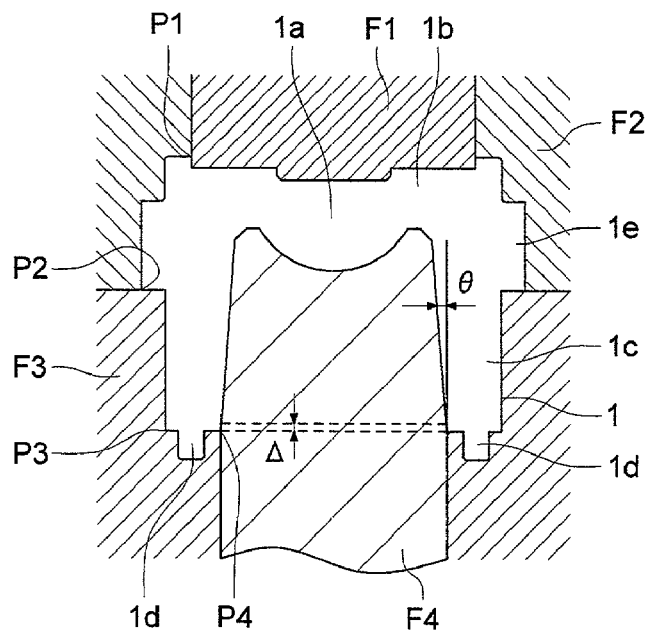
FIG. 10 is a drawing representing the status of molding an image pick-up lens according to the present invention.

FIG. 10 is a drawing representing the status of molding an image pick-up lens according to the present invention. FIGS. 4(*a*) to (*d*) are bottom views of the image pick-up lens obtained from the aforementioned molding procedure. The image pick-up lens 1 is made of transparent plastic and comprises a tubular supporting part 1c, four contact portions 1d formed on the lower end of the supporting part 1c as part thereof, a shoulder 1e formed around the upper end of the supporting part 1c, an plate-formed upper surface 1b for blocking the upper end of the supporting part 1c, and a convex lens 1a formed at the center of the upper surface 1b formed into an integral body, as shown in FIG. 10. The flange part 1e is not perfectly circular as in the case of in FIGS. 4(*b*) to (*d*). Part thereof is preferably cut on the plane surface to form so-called a D-cut portion 1f.

The profiles of the upper surface 1b of the image pick-up lens 1 and the upper surface of the convex lens 1a are formed by an upper central mold F1. The profile of the external upper half including the shoulder 1e of the image pick-up lens 1 is formed by an upper peripheral mold F2 arranged around the upper central mold F1. The profile of the external lower half including the supporting part 1c of the image pick-up lens 1 and that of the end portion including the contact portion 1d of the image pick-up lens 1 are formed by a lower half mold F3. The lens 1a of the image pick-up lens 1 and the inside profile including the inner peripheral surface of the supporting part 1c are formed by a core mold F4.

The following describes how to mold the image pick-up lens 1. As shown in FIG. 10, after molds F1 to F4 have been set, plastic material molten from the gate (preferably provided on part of the flange part 1e) is poured. In this case, the mold split portion at the time of molding operation is preferred to be the portions P1 to P4, as shown in FIG. 10. After the plastic material has been solidified, the mold of the portion P2 opens and the image pick-up lens 1 remains in molds F1 and F2. Then the mold F1 is pushed out and the image pick-up lens 1 can be taken out.

As is clear from F*ig*. 1(*b*), portions P1 to P4 are not in contact with other members. Even if burrs occur to the portions P1 to P4 during the molding operation, there is no adverse effect on positioning (e.g. positioning for focusing the convex lens 1a) at the time of assembling the image pick-up lens 1, thereby ensuring accurate assembling.

To form images in sharp focus with respect to the photo-electric conversion unit 2d of the image pick-up device 2b, the focusing position of the lens 1a and end the face of the contacting portion must be aligned in the direction of optical axis. However, alignment may not be achieved due to insufficient mold accuracy or the like. In such cases, the core mold F4 is moved in the direction of optical axis in FIG. 10. This makes it possible to change the distance (L in FIG. 1(*b*)) between the lens 1a and the end of the contact portion 1d. If the optimum position of the core mold F4 has been determined, it is possible to get an image pick-up lens 1 which permits formation of images in sharp focus with respect to the photo-electric conversion unit 2d of the image pick-up device 2b.

To prevent unwanted light from being reflected, the inner peripheral surface of the supporting part 1c of the image pick-up lens 1 is provided with microscopic asperities in some cases. If an ordinary draft at 2 degrees or less is provided on the outer peripheral surface of the core mold F4, mold-parting property may be deteriorated. To avoid this in the present embodiment, the outer peripheral surface of the core mold F4 is tapered at an angle of 3 degrees or more in such a way that the diameter becomes smaller in the deeper position.

As described above, however, the core mold F4 must be moved relative to the mold F3. As a result, there may be an increase in the clearance between the core mold F4 and mold F3 due to the taper of the core mold F4, depending on the relative position. To solve this problem, a cylindrical form is used in the range (Δ) from the split portion P4 of the mold at the time of molding operation to the point of the maximum travel of the core mold F4 on the outer peripheral surface of the core mold F4 in order to ensure that there is no increase in the clearance between them even when the core mold F4 is moved relative to the mold F3.

Figure 11:
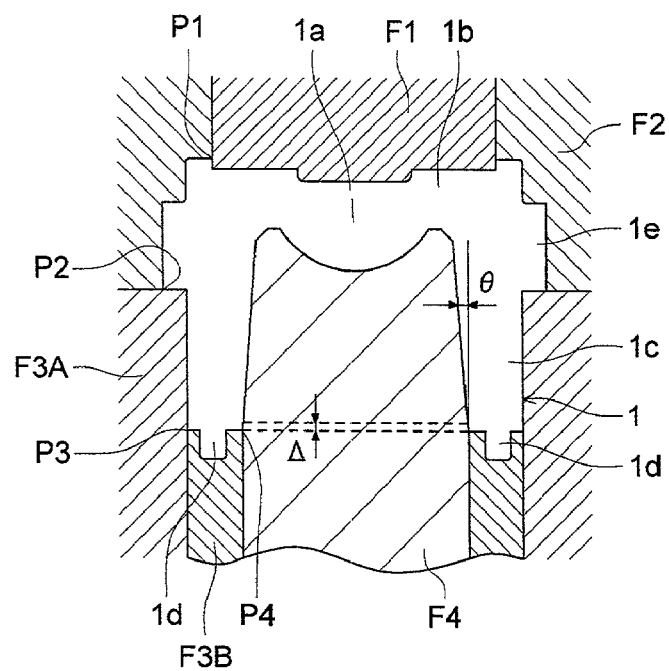
FIG. 11 is another drawing representing the status of molding an image pick-up lens according to the present invention.
Figure 12:
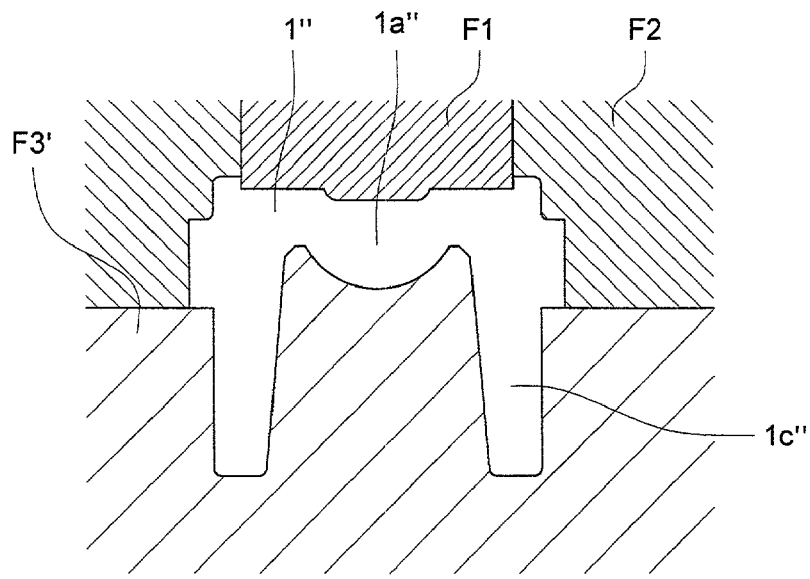
FIG. 12 is a further drawing representing the status of molding an image pick-up lens according to the present invention.
Figure 13:
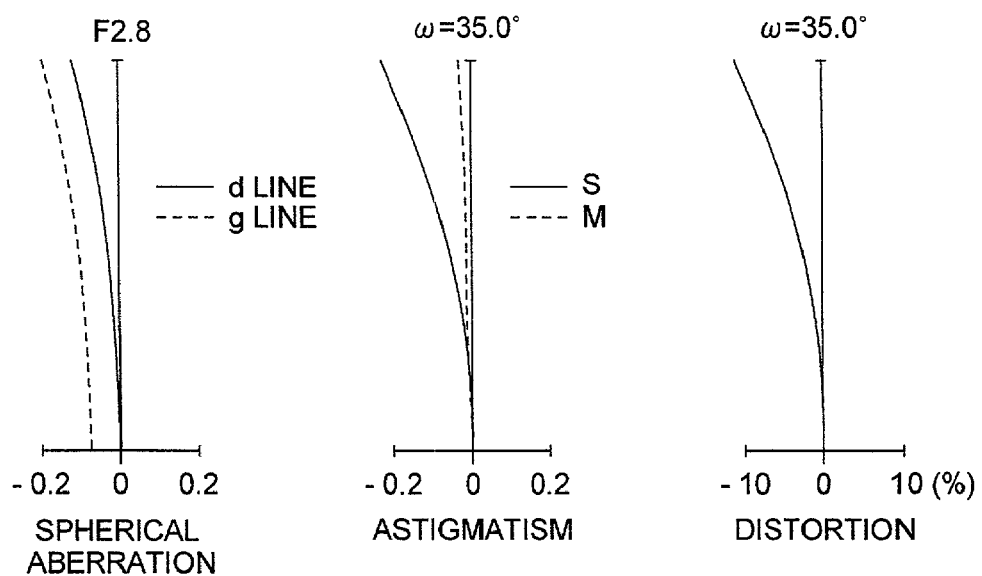
FIG. 13 is an aberration drawing of the first embodiment (Embodiment 1) of the lens 1a of the optical member 1 which is applicable to the embodiment shown in FIGS. 1 and 8.

FIG. 11 is another drawing representing the status of molding an image pick-up lens according to the present invention. FIGS. 4(*a*) to (*d*) are the bottom views of this image pick-up lens. FIG. 12 is a drawing representing a comparative example. This embodiment is different from the aforementioned embodiments shown in FIG. 1 and others only in the profile of the mold. So description will be omitted to avoid duplication.

For example, if the lower mold F3' is shaped so as to enclose the lower half of the image pick-up lens 1" entirely as shown in FIG. 12, then it is possible to prevent the burrs from occurring on the end face of the supporting part 1c". However, this profile requires such additional processing as cutting of the lower mold F3' in order to adjust the positional relationship between the focusing point of the convex lens 1a" of the image pick-up lens 1" and the end face of the supporting part 1c". It is difficult to adjust the positional relationship accurately.

To solve this problem, the embodiment shown in FIG. 10 is designed to ensure that the end face of the contact portion 1d can be positioned in the vicinity of the focusing point of the convex lens 1a of the image pick-up lens 1 by adjusting the amount of the protrusion of the core mold F4. However, if the amount of protrusion of the core mold F4 is adjusted, variations may occur to the thickness of the convex lens 1a on the axis. If there is a big deviation of thickness on the axis from the design value, the optical characteristics may be deteriorated.

To solve this problem, the present embodiment show in FIG. 11 is designed in such a way that the lower circumstantial mold F3 given in FIG. 11 is divided into a circumstantial mold 3A and a terminal mold 3F. In order to ensure that the end surface of the contacting portion 1d is accurately positioned in the vicinity of the focusing point of the convex lens 1a of the image pick-up 1, the circumstantial mold F3A, terminal mold (first mold) F3B and core mold (second mold) F4 are positioned in the direction of optical axis in FIG. 10. Under this condition, the terminal mold F3B is subjected to relative shift in the direction of optical axis. This allows the distance (L in F*ig*. 1(*b*)) between the convex lens 1a and contact portion 1d to be adjusted without changing the thickness of the convex lens 1a on the axis.

In the present embodiment as well, the mold split portions P3 and P4 at the time of molding operation are located away from the end face of the contact portion 1d, similarly to the case of FIG. 1. So even if burrs have occurred, accurate assembling is ensured without any adverse effect being given to the positioning (e.g. positioning of the focusing point of the convex lens 1a) at the time of assembling of the image pick-up lens 1.

FIG. 11 is an aberration drawing the first embodiment (Embodiment 1) of the lens 1a of the optical member 1 which is applicable to the embodiment shown in FIGS. 1 and 8. Table 1 shows the data on the lens according to the present embodiment. The image distance for design reference is 500 mm. The lens of the present embodiment is made of poltyolefinic plastic material.

TABLE 1

(Embodiment 1)

f = 3.21
F = 2.8
2ω = 70.0°

| Surface No. | r | d | nd | vd |
|---|---|---|---|---|
| 1 (aperture) | ∞ | 0.20 | | |
| *2 | −10.428 | 1.60 | 1.53000 | 55.5 |
| *3 | −1.539 | | | |

Aspherical surface coefficient

Second surface

K = 0.0
A4 = −5.59450 × $10^{-2}$
A6 = −2.90680 × $10^{-2}$
A8 = −4.98890 × $10^{-3}$
A10 = −1.38940 × $10^{-3}$
A12 = −1.53220 × $10^{-3}$

Third surface

K = 0.0
A4 = 7.96360 × $10^{-3}$
A6 = 2.83640 × $10^{-4}$
A8 = 3.51190 × $10^{-5}$
A10 = 1.61030 × $10^{-5}$
A12 = 9.74630 × $10^{-6}$

The symbols used in the Tables of this Specification are defined as follows: f denotes a focal distance (mm) for all systems, F an F-number, ω a half angle of view, r a curvature radius (mm), d a surface spacing on axis (mm), nd a refractive index with respect to line d, and ν a Abbe's number.

The asterisk (*) in the surface number denotes non-spherical state. This aspherical surface can be expressed by the following equation in an perpendicular coordinate system with the apex of a surface as an origin and the direction of optical axis as an X-axis direction, where C denotes an apex curvature, K a cone constant, and A4, A4, A7, A10 and A12 aspherical coefficients:

$$X = \frac{Ch^2}{1+\sqrt{1-(1+K)C^2h^2}} + A_4h^4 + A_6h^6 + A_8h^8 + A_{10}h^{10} + A_{12}h^{12} \quad \text{Equation 1}$$

$$h = \sqrt{Y^2 = Z^2} \quad \text{Equation 2}$$

Figure 14:
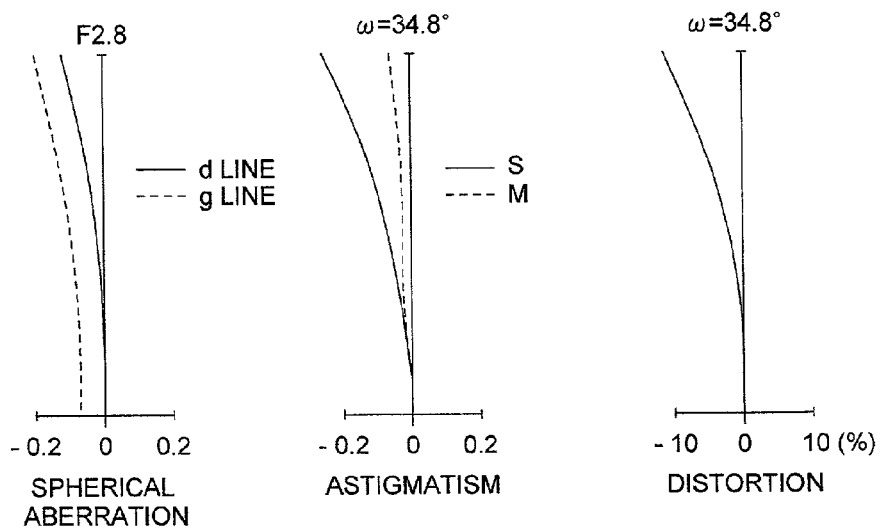
FIG. 14 is an aberration drawing of the second embodiment (Embodiment 2) of the lens 1a of the optical member 1 which is applicable to the embodiment shown in FIGS. 1 and 8.

FIG. 14 is an aberration drawing on the second embodiment (Embodiment 2) of the lens 1a of the optical member 1 which is applicable to the embodiment shown in FIGS. 1 and 8. Table 1 shows the data on the lens according to the present embodiment. The image distance for design reference is 500 mm in the present embodiment. The lens of the present embodiment is made of poltyolefinic plastic material.

TABLE 2

(Embodiment 2)

f = 3.23
F = 2.8
2ω = 69.6°

| Surface No. | r | d | nd | vd |
|---|---|---|---|---|
| 1 (aperture) | ∞ | 0.20 | | |
| *2 | −11.087 | 1.60 | 1.50920 | 56.5 |
| *3 | −1.500 | | | |

Aspherical surface coefficient

Second surface

K = 0.0
A4 = −5.80000 × $10^{-2}$
A6 = −2.80000 × $10^{-2}$
A8 = −9.00000 × $10^{-3}$
A10 = −7.50000 × $10^{-3}$
A12 = −1.70000 × $10^{-2}$

Third surface

K = 0.0
A4 = 9.20000 × $10^{-3}$
A6 = 7.00000 × $10^{-4}$
A8 = 1.00000 × $10^{-4}$
A10 = 7.00000 × $10^{-5}$
A12 = 5.00000 × $10^{-5}$

The forgoing description has been given with reference to embodiments of the present invention. However, the present invention should be understood as including appropriate modifications and improvement, without being restricted to the aforementioned embodiments. For example, a wire is used for connection between the image pick-up device 2 and base board PC in the present embodiment. It is also possible to route the wire inside the image pick-up device 2b, and to take out signals from the back (opposite to the photo-electric conversion unit) or side of the image pick-up device 2b. When this configuration is adopted, a wide space can be provided around the image pick-up device, and wire connection can be facilitated. Further, the image pick-up unit is composed only of the image pick-up device which is a bare chip in the present embodiment. However, it is also possible to bond a glass or other protective member on the upper and lower surface thereof, thereby forming an integral image pick-up unit. The base board need not be hardware; it can be flexible. The image pick-up apparatus of the present invention can be built in a cellular phone, personal computer, PDA, AV device, television set, home electronic appliances and many other products.

EFFECTS OF THE INVENTION

The present invention provides a highly reliable image pick-up lens, image pick-up apparatus and the image pick-up lens forming method wherein a reduced number of component parts can be assembled accurately in a compact configuration at a reduced cost without the need of adjustment, and dust-and moisture-proof structure is provided to ensure high quality image.

What is claimed is:

1. An image pick-up lens, comprising: a lens part to form an image point of an object point at predetermined distance; and a supporting part to support the lens part and integrally formed with the lens part in a tubular form extended from the periphery of the lens part along theoretical axis of the lens part, and the tip end of the tubular form is included in an ideal plane surface perpendicular the optical axis of the lens part, wherein the image point is located in the ideal plane surface.

2. The image pick-up lens of claim 1, wherein the lens part and the supporting part are integrally formed from a plastic material.

3. The image pick-up lens of claim 1, wherein the supporting part is formed in a cylindrical form.

4. The image pick-up lens of claim 1, wherein the supporting part has an engaging portion for positioning the lens part in the direction perpendicular to the optical axis of the lens part.

5. The image pick-up lens of claim 1, wherein the supporting part has a contacting portion, which includes the tip end of the supporting part and is located on an edge of the supporting part, and the thickness of the contacting portion in the direction perpendicular to the optical axis of the lens part is thinner than the thickness of the supporting part other than the contacting portion.

6. The image pick-up lens of claim 1, wherein the supporting part has contacting portions, which are located on an edge of the supporting part discontinuously in the circumferential direction and include the tip end of the supporting part.

7. The image pick-up lens of claim 1, wherein when the lens is mounted on a flat surface while the tip end of the supporting part contacts the flat surface, the optical axis of the lens part is perpendicular to the flat surface.

8. The image pick-up lens of claim 1, wherein the saturated water absorption rate of the image pick-up lens is 1.2% of less.

9. The image pick-up lens of claim 1, wherein the supporting part is formed from a plastic material having a light blocking effect.

10. The image pick-up lens of claim 1, wherein at least a part of the inner peripheral surface of the supporting part is subjected to an internal antireflection treatment.

11. The image pick-up lens of claim 1, wherein the inner peripheral surface of the supporting part is tapered so that the interior diameter of the supporting part is reduced as coming closer to the lens part, and the taper angle of the inner peripheral surface is 3 degree or more.

12. An image pick-up apparatus, comprising: an image pick-up device to convert an optical image into image signals, and having a photo-electric conversion unit; and an image pick-up lens comprising: a lens part to form an image point of an object point at predetermined distance; and supporting part to support the lens part and integrally formed with the lens part a tubular form extended from the periphery of the lens part along the optical axis of the lens part, and the tip end of the tubular form is included in an ideal plane surface perpendicular to the optical axis lens part, of the wherein the image point located in the ideal plane surface.

13. The image pick-up apparatus of claim 12, wherein the lens part and the supporting part are integrally formed from a plastic material.

14. The image pick-up apparatus of claim 12, wherein the supporting part is formed in a cylindrical form.

15. The image pick-up apparatus of claim 12, wherein the image pick-up apparatus has a lens frame containing the image pick-up lens internally, and the supporting part has an engaging portion for positioning the lens part in the direction perpendicular to the optical axis of the lens part by engaging the lens frame.

16. The image pick-up apparatus of claim 12, wherein the supporting part has a contacting portion, which includes the tip end of the supporting part and is located on an edge of the supporting part, and the contacting portion contacts the image pick-up device.

17. The image pick-up apparatus of claim 12, wherein the image pick-up lens is mounted on the image pick-up device while the tip end of the supporting part contacts the image pick-up device, and the optical axis of the lens part is perpendicular to the image pick-up device.

18. The image pick-up apparatus of claim 12, wherein the saturated water absorption rate of the image pick-up lens is 1.2% of less.

19. The image pick-up apparatus of claim 12, wherein the supporting part is formed from a plastic material having a light blocking effect.

20. The image pick-up apparatus of claim 12, wherein at least a part of the inner peripheral surface of the supporting part is subjected to an internal antireflection treatment.

21. The image pick-up apparatus of claim 12, wherein the inner peripheral surface of the supporting part is tapered so that the interior diameter of the supporting part is reduced as coming closer to the lens part, and the taper angle of the inner peripheral surface is 3 degree or more.

22. An image pick-up lens comprising:
    a lens part to form an image point of an object point at predetermined distance;
    a flange part formed around the periphery of the lens part;
    a supporting part to support the lens part and integrally formed with the lens part in a tubular form extended from the periphery of the lens part along the optical axis of the lens part; and
    an engaging portion provided around the outer surface of the supporting part closer to the optical axis of the lens part than the outer surface of the flange part for positioning in the direction perpendicular to the optical axis of the lens part.

23. The image pick-up lens of claim 22, wherein the supporting part has a contacting portion for positioning in the optical axis direction of the lens part.

24. The image pick-up lens of claim 22, wherein the flange part is a portion for receiving an elastic force from an elastic member.

25. The image pick-up lens of claim 24, wherein the elastic member is a coil spring.

26. The image pick-up lens of claim 22, wherein the flange part has a rotary stopper for preventing rotating with a central axis on the optical axis of the lens part.

27. The image pick-up lens of claim 26, wherein the rotary stopper has a plane portion parallel to or substantially parallel to the optical axis of the lens part.

28. The image pick-up lens of claim 22, wherein the image pick-up lens has a shoulder for fitting an aperture member for regulating the F-number of the lens on the object side with respect to the lens part.

29. An image pick-up apparatus comprising:
    a base board;
    an image pick-up device provided on the base board and to convert an optical image into image signals; and an image pick-up lens to form an image onto the image pick-up device and comprising:

a lens part;

a flange part formed around the periphery of the lens part;

a supporting part to support the lens part and integrally formed with the lens part in a tubular form extended from the periphery of the lens part along the optical axis of the lens part; and an engaging portion provided around the outer surface of the supporting part closer to the optical axis of the lens part than the outer surface of the flange part for positioning in the direction perpendicular to the optical axis of the lens part.

30. The image pick-up apparatus of claim 29, wherein the supporting part has a contacting portion on an edge of the supporting part to contact the image pick-up device.

31. The image pick-up apparatus of claim 30, wherein the apparatus has an elastic member for applying an elastic force to the image pick-up lens for bringing the contacting portion into contact with the image pick-up device.

32. The image pick-up apparatus of claim 31, wherein the flange part receives the elastic force from the elastic member.

33. The image pick-up apparatus of claim 31, wherein the elastic member is a coil spring.

34. The image pick-up apparatus of claim 29, wherein the apparatus has a lens frame provided on the base board, and the flange part has a rotary stopper for preventing a relative rotating with a central axis on the optical axis of the lens part.

35. The image pick-up apparatus of claim 34, wherein the rotary stopper has a plane portion parallel to or substantially parallel to the optical axis of the lens part.

36. A method of producing the image-pick up lens of claim 1 with a first mold to form a surface on the tip end of the supporting part and second mold form a tip end side optical surface of the lens part, comprising the step of: moving relatively the first mold and the second mold along the optical axis of the lens part so that the image point is located in the ideal plane surface.

* * * * *